US012657203B1

(12) United States Patent
Woodward et al.

(10) Patent No.: US 12,657,203 B1
(45) Date of Patent: Jun. 16, 2026

(54) INTEGRATION PLATFORM AS A SERVICE WITH DATA-DRIVEN MAPPINGS AND CUSTOM PROVIDERS

(71) Applicant: Synqly, Inc., San Jose, CA (US)

(72) Inventors: Lucas Daniel Woodward, Clackamas, OR (US); Marcus Victor Stade, Stockholm (SE); Andrew Robert Curtis, Boulder, CO (US)

(73) Assignee: Synqly, Inc., San Jose, CA (US)

( * ) Notice: Subject to any disclaimer, the term of this patent is extended or adjusted under 35 U.S.C. 154(b) by 0 days.

(21) Appl. No.: 19/425,867

(22) Filed: Dec. 18, 2025

(51) Int. Cl.
*G06F 16/25* (2019.01)
*G06F 16/21* (2019.01)

(52) U.S. Cl.
CPC .......... *G06F 16/254* (2019.01); *G06F 16/211* (2019.01)

(58) Field of Classification Search
CPC .............................. G06F 16/211; G06F 16/254
See application file for complete search history.

(56) References Cited

U.S. PATENT DOCUMENTS

| | | | | |
|---|---|---|---|---|
| 10,924,587 | B1 * | 2/2021 | Chaudhuri ............ | G06F 16/214 |
| 2004/0006563 | A1 * | 1/2004 | Zwiegincew ....... | G06F 16/2443 |
| 2008/0082514 | A1 * | 4/2008 | Khorlin ................... | G06F 16/80 |
| 2009/0177681 | A1 * | 7/2009 | Fagin ................... | G06F 16/284 |
| | | | | 707/999.102 |

| | | | | |
|---|---|---|---|---|
| 2014/0324857 | A1 * | 10/2014 | Hazelwood ........... | G06F 16/907 |
| | | | | 707/736 |
| 2015/0161199 | A1 * | 6/2015 | Pinko .................... | G06F 9/4488 |
| | | | | 707/736 |
| 2016/0371805 | A1 * | 12/2016 | Knotts .................... | G06Q 50/20 |
| 2019/0034801 | A1 * | 1/2019 | Sodhani ................. | G06N 3/088 |
| 2023/0315738 | A1 * | 10/2023 | Srinivasa ............ | G06F 16/2465 |
| | | | | 707/714 |
| 2026/0057391 | A1 * | 2/2026 | Greenberg ............. | G06Q 30/01 |

* cited by examiner

*Primary Examiner* — Jay A Morrison
(74) *Attorney, Agent, or Firm* — JONES DAY

(57) ABSTRACT

An integration platform, which integrates heterogenous provider systems behinds a normalized interface, accepts a declarative mapping template that specifies field-level relationships and transformations between provider schemas and a normalized schema. The template is validated and processed into compiled transformations. Executing the compiled logic converts provider payloads into the normalized schema for client consumption and applies reverse transformations to map client-supplied normalized data back to provider-native schemas for submissions. Client queries and ordering requests expressed against normalized fields are translated into intermediate, provider-agnostic representations that normalize keys, operators, directions, and typed values. These intermediate filter and order representations are then formatted into provider-native request syntaxes for transmission to provider systems. Integrations operate without persisting provider data at rest within the platform, enabling operation and minimizing data residency. The approach unifies read and write flows, supports consistent query and ordering semantics, and simplifies connectivity across diverse providers.

30 Claims, 4 Drawing Sheets

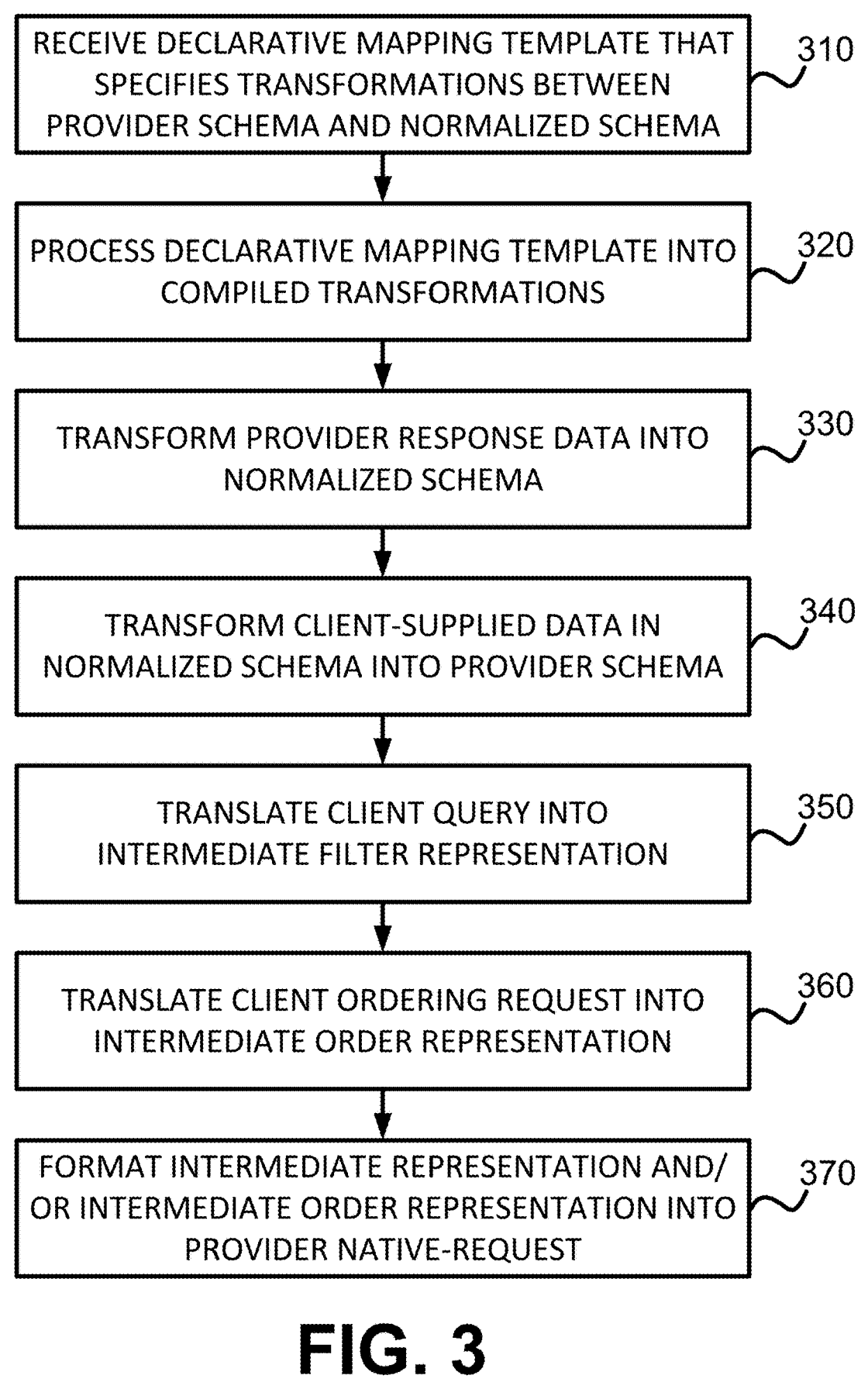

RECEIVE DECLARATIVE MAPPING TEMPLATE THAT SPECIFIES TRANSFORMATIONS BETWEEN PROVIDER SCHEMA AND NORMALIZED SCHEMA — 310

PROCESS DECLARATIVE MAPPING TEMPLATE INTO COMPILED TRANSFORMATIONS — 320

TRANSFORM PROVIDER RESPONSE DATA INTO NORMALIZED SCHEMA — 330

TRANSFORM CLIENT-SUPPLIED DATA IN NORMALIZED SCHEMA INTO PROVIDER SCHEMA — 340

TRANSLATE CLIENT QUERY INTO INTERMEDIATE FILTER REPRESENTATION — 350

TRANSLATE CLIENT ORDERING REQUEST INTO INTERMEDIATE ORDER REPRESENTATION — 360

FORMAT INTERMEDIATE REPRESENTATION AND/ OR INTERMEDIATE ORDER REPRESENTATION INTO PROVIDER NATIVE-REQUEST — 370

FIG. 3

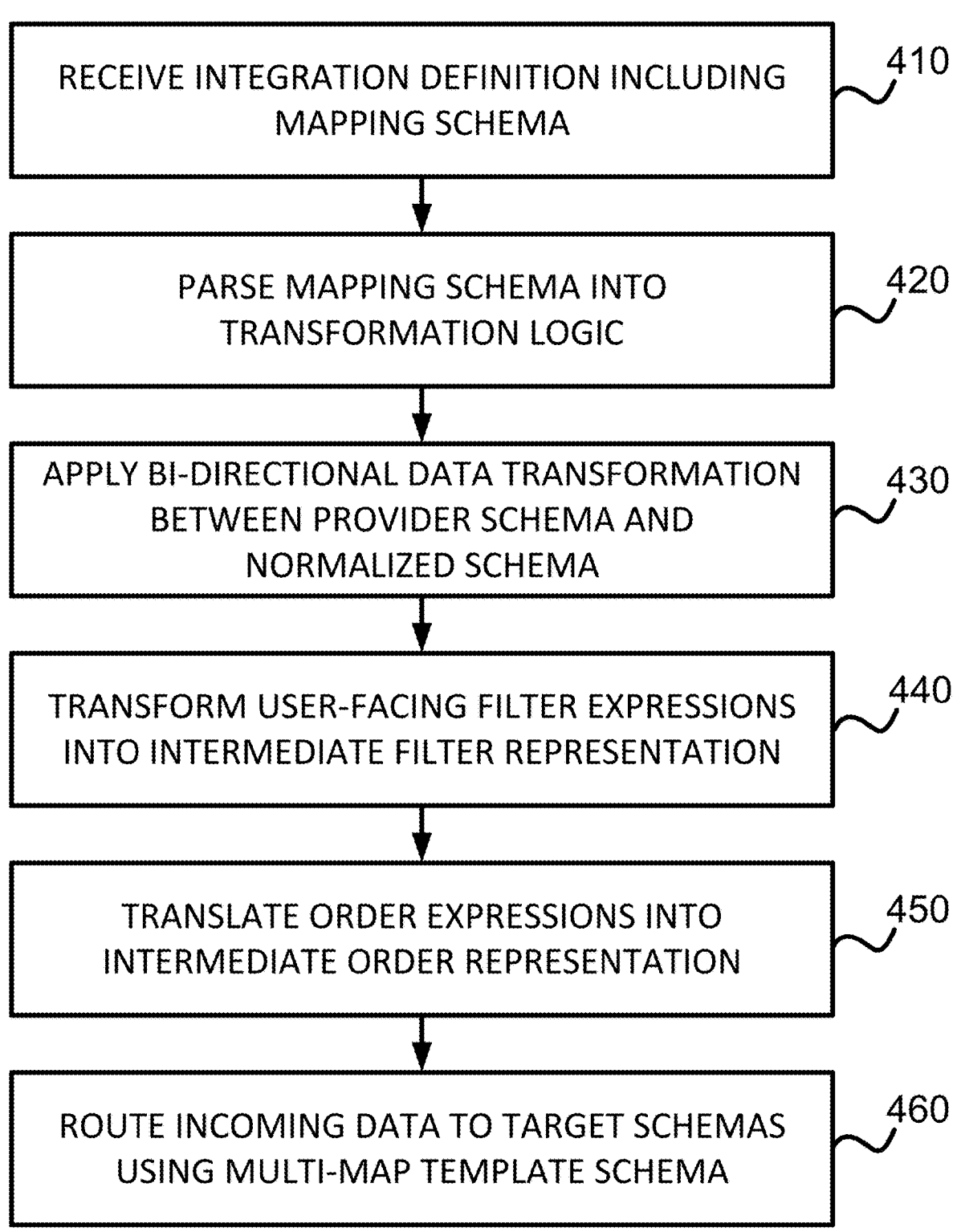

RECEIVE INTEGRATION DEFINITION INCLUDING MAPPING SCHEMA ~410

PARSE MAPPING SCHEMA INTO TRANSFORMATION LOGIC ~420

APPLY BI-DIRECTIONAL DATA TRANSFORMATION BETWEEN PROVIDER SCHEMA AND NORMALIZED SCHEMA ~430

TRANSFORM USER-FACING FILTER EXPRESSIONS INTO INTERMEDIATE FILTER REPRESENTATION ~440

TRANSLATE ORDER EXPRESSIONS INTO INTERMEDIATE ORDER REPRESENTATION ~450

ROUTE INCOMING DATA TO TARGET SCHEMAS USING MULTI-MAP TEMPLATE SCHEMA ~460

FIG. 4

INTEGRATION PLATFORM AS A SERVICE WITH DATA-DRIVEN MAPPINGS AND CUSTOM PROVIDERS

TECHNICAL FIELD

The subject matter described herein relates to techniques for service-based integrations across a wide variety of heterogenous providers which leverage data-driven mappings and custom providers.

BACKGROUND

Enterprises routinely integrate with disparate security and information technology platforms—such as Security Information and Event Management, Endpoint Detection and Response, identity, ticketing, Cloud Security Posture Management, asset, and vulnerability systems—that expose heterogeneous schemas, idiosyncratic query languages, divergent authentication mechanisms, and inconsistent capabilities for filtering, ordering, timestamps, and enumerations. Traditional adapter-style approaches tend to be brittle and slow, with one-off code paths that are difficult to reuse and that generally treat schema translation as a unidirectional, data-only exercise, leaving filter and order translation unaddressed or inconsistently handled across providers.

SUMMARY

The subject matter provided herein integrates diverse provider systems behind a single, normalized interface. An integration platform accepts a declarative mapping template that defines how each field from a provider's schema relates to fields in a normalized schema, including transformations, enumerations, data types, reversibility, and any direct transformation scripts. The template is validated for reversibility, type consistency, and mapping completeness, then compiled into compiled transformations using an embedded transformation language to produce executable logic for data transformation, filter translation, and order translation. Executing the compiled transformations converts provider responses into the normalized schema for client use and converts client-supplied normalized data back into provider-native schema for write operations, while avoiding storage of provider data at rest within the platform.

Client queries and ordering requests expressed on normalized fields are translated into provider-agnostic intermediate filter representations that use normalized keys, typed values, and standardized operators or directions. Timestamps, enumerations, and Boolean inputs provided as strings are normalized into typed values based on the template's data type declarations before forming the intermediate filter representation. The platform rejects filter or ordering operations that are unsupported by a mapping-defined capability of a target field. These intermediate filter representations are formatted into a provider's native request syntax without further key or value translation, and are used within per-operation pipelines that may include pre- and post-processing mappings for URL, path, request body shaping, credential selection, and response shaping.

The mapping template may define a multimap configuration to support content-based routing among multiple normalized targets. Incoming provider data is evaluated against context expressions to select an appropriate default target template, and translated filters are augmented with target-specific constraints when a query references fields present only in a subset of target templates. The configuration can specify conditions under which contextual filters are omitted when a client explicitly constrains a disambiguating field. Partial templates can be imported before and after a main mapping to enable modular, reusable logic. Escape hatch direct mappings may be specified for destination mappings, source mappings, filter mappings, and order mappings to provide explicit control over transformations where necessary. The template can declare generic data types such as string, number, datetime, Boolean, array, and object, and can define custom types that specify target generic types, coercions in both directions, supported filter operators, and ordering capabilities. Mapped fields can be selectively excluded from reverse transformations to prevent writing specific normalized fields back to the provider.

The platform supports multi-target routing such that incoming data is programmatically inspected for context values and directed to corresponding target templates with context-specific filter augmentation. A management API exposes create, read, update, and delete operations for mapping templates, selection of mappings per integration or resource type, and a verify/apply endpoint to test templates against example payloads. The system executes integrations statelessly without persisting provider data, and compiles mapping templates expressed in a structured format such as YAML into provider-agnostic intermediate representations for filters and ordering, while the runtime engine applies compiled transformations to input payloads and performs reverse mappings for write operations. A provider formatter converts the intermediate filter and order representations into provider-native request formats, and a network interface enables communication with external provider systems and client devices.

An additional management API can expose create, read, update, and delete operations for custom provider configuration definitions within the platform. Custom provider configurations can define provider authorization, endpoints, operation identifiers, and per-operation pipelines that apply pre-processing mappings to outgoing requests, format the intermediate filter and order representations into the provider's protocol-specific syntax, and/or apply post-processing mappings to responses prior to data transformation.

DESCRIPTION OF DRAWINGS

FIG. 3 is a process flow diagram for integrating heterogeneous provider systems with a normalized interface; and FIG. 4 is a process flow diagram for declarative, bidirectional data mapping between heterogeneous provider schemas and a normalized schema.

DETAILED DESCRIPTION

Figure 1:
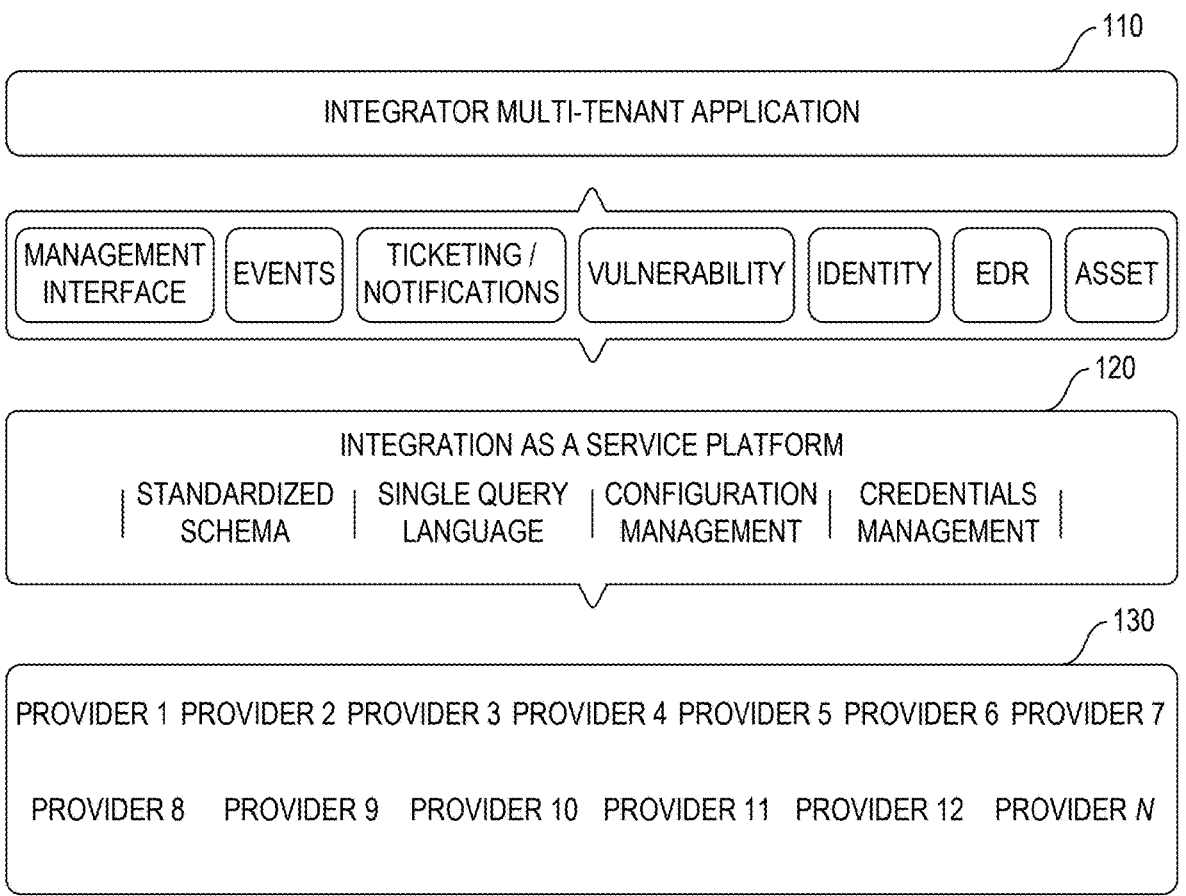
FIG. 1 is a first diagram illustrating aspects of an integration platform as a service.

FIG. 1 is an architecture diagram illustrating the relationship among an integrator multi-tenant application 110, an integration platform as a service (IPaaS) 120, and a plurality of third-party providers 130. The third-party providers 130 can span the cybersecurity continuum and can include identity and access management (IAM) services, security information and event management (SIEM) platforms, security orchestration, automation, and response (SOAR) systems, endpoint detection and response (EDR) and extended detection and response (XDR) tools, vulnerability assessment and management solutions, asset discovery and configuration management database (CMDB) systems, threat intelligence feeds, ticketing and IT service management (ITSM) systems, messaging and notification services, cloud security posture management (CSPM) and cloud workload protection platforms (CWPP), network security controls (e.g., firewalls, IDS/IPS, SASE), data loss prevention (DLP) and email security products, secrets management and public key infrastructure (PKI) services, incident response tooling, and governance, risk, and compliance (GRC) platforms. In the illustrated architecture, the integrator multi-tenant application 110 is a vendor-facing, cloud-hosted environment configured to serve multiple tenants concurrently, each tenant representing a distinct product line, customer account, or deployment context. The multi-tenant application 110 exposes embedded configuration and management interfaces through which tenants select, authenticate, and administer integrations, including provisioning of credentials, defining event and data mappings, and activating connectors for desired categories of third-party services. In addition, the multi-tenant application 110 can provide a unified management interface and can surface security functions to tenants, including event monitoring, ticketing and notifications, vulnerability analysis, identity services, EDR, and asset management, either natively or by orchestrating capabilities of providers 130 through the IPaaS 120. The multi-tenant application 110 interfaces programmatically with the IPaaS 120 over a standardized API, enabling tenants to invoke a unified set of integration capabilities without building or maintaining bespoke adapters to each third-party provider 130.

The IPaaS 120 functions as an intermediary orchestration and translation layer that abstracts the heterogeneity of external providers 130. The IPaaS 120 can maintain a standardized schema and unified query language to normalize data models, events, and actions across disparate provider APIs, including but not limited to identity, endpoint detection and response (EDR), asset management, vulnerability, ticketing, and notification systems. The IPaaS 120 can employ multiplex connectors that provide bidirectional data exchange and action execution, insulating the multi-tenant application 110 from changes in provider-specific API contracts by updating the connectors as providers 130 evolve their interfaces. In operation, the IPaaS 120 receives tenant-scoped integration instructions from the multi-tenant application 110, applies schema normalization and routing logic, and securely transmits requests, events, or configuration updates to the appropriate third-party providers 130. Responses, events, and status data received from providers 130 are normalized by the IPaaS 120 and propagated back to the multi-tenant application 110 for downstream processing, analytics, and tenant-visible health and usage reporting.

Figure 2:
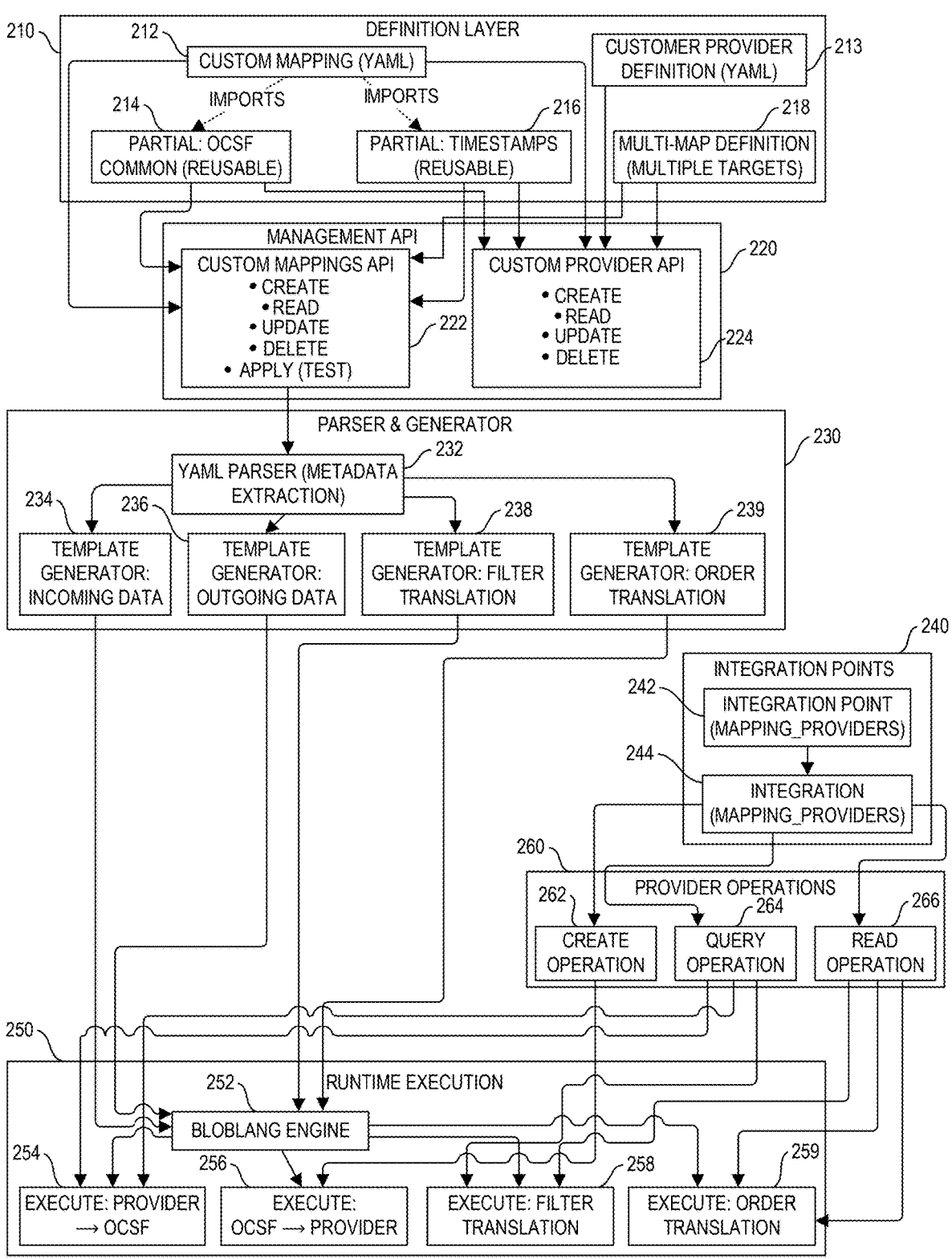
FIG. 2 is a second diagram illustrating aspects of an integration platform as a service.

In some implementations, the IPaaS 120 can expose an embeddable connect interface (e.g., a GUI, chatbot, etc.) that the multi-tenant application 110 integrates to guide tenant administrators through discovery, selection, configuration, and testing of integrations, including credential establishment, scoping, and validation. Credential materials can be managed in a security-first manner, with encryption at rest and in transit, and storage minimized or localized as required by deployment constraints. The IPaaS 120 can further support flexible deployment modes, including multi-region software as a service, single-container deployments suitable for regulated environments, and lightweight edge components to facilitate connectivity to on-premises providers, thereby enabling integration with both cloud and on-premises third-party providers 130 under consistent control and observability. The architecture thus allows the integrator multi-tenant application 110 to integrate once to the IPaaS 120 and connect to many providers 130, while maintaining tenant isolation, centralized configuration, continuous compatibility with evolving provider APIs, and comprehensive operational monitoring of integration usage, failures, timing, and root cause across the tenant population. Building on this architecture, the following sections describe how declarative mappings and a provider framework can realize these integrations by the IPaaS 120 across a plurality of heterogenous providers 130 and FIG. 2 depicts the corresponding definition, generation, and runtime pipeline that implements these capabilities.

As mentioned above, the current subject matter is directed to a data-driven, declarative mapping paradigm that normalizes provider-specific schemas into a unified representation, supports reverse mappings for write-backs, and separates semantic translation from protocol formatting can streamline development, enhance reuse, and reduce operational risk. By introducing provider-agnostic intermediate representations for filters and ordering, key and value normalization can be performed once, enabling a single coherent query surface across heterogeneous backends while allowing provider-specific formatting to occur at the edge. A stateless runtime that pairs versioned mapping templates with pluggable provider definitions—expressed in YAML Ain't Markup Language (YAML) and supplemented by targeted transformation snippets—can further accelerate integration creation, support multi-target routing of records based on content, and make capabilities such as validation, reversibility checks, and verification against example payloads programmatic and testable, all without persisting provider data.

Within this architecture, the IPaas 120 provides techniques to enable users (e.g., customers, etc.) and third parties to rapidly create and operate enterprise security software integrations without writing bespoke code for each provider 130. This can be accomplished by combining a data-driven, declarative mapping language, a custom provider framework, and a management API. The mapping language translates bidirectionally between heterogeneous provider schemas and a normalized schema such as Open Cybersecurity Schema Framework (OCSF) across data transformation, filter translation, and order translation use cases. The provider framework can use a YAML provider description and runtime configuration to declaratively define authorization, endpoints, and per-operation pipelines, including pre- and post-mappings and URL, body, and response transformations. The management API can support creating, reading, updating, and deleting mapping templates, selecting mappings per integration or integration point, and verifying and applying mappings against example payloads. The IPaaS 120 can avoid storing provider data at rest, and each integration is defined by the pairing of a mapping and a provider configuration, yielding stateless operation. This approach delivers low- or no-code provider creation and unifies query semantics across disparate providers 130 through provider-agnostic intermediate representations for filter and order expressions. Data schema transformations are bi-directional and can support multi-target routing through "multi-map" selection that routes inputs to different normalized outputs based on content. The novelty lies in using a single mapping for bi-directional data transformation, filter translation, and order translation. These elements correspond to the definition layer and management APIs shown in FIG. 2, which govern authoring, versioning, and validation of mappings prior to runtime execution.

These techniques define integrations using a declarative template language rather than traditional code. An integration maps a target provider API into a unified API that generalizes multiple products within the same category. The integration is decomposed into transformations between the provider API and the unified API for endpoints, query parameters, filters, and result ordering, and a bi-directional transformation between the provider's data schema and the unified schema. The system uses a versioned YAML mapping schema to declare field-level transformations, including enumerations, coercions, local variables, static inserts, and reverse mappings. It introduces provider-agnostic intermediate representations for query filters and order-by lists that decouple user-facing fields from provider-native syntax so providers consume normalized, typed keys and values and only implement protocol-specific formatting. It can support multiple template types, including default templates for single targets, partials that can be imported pre- or post-processing to enable reuse, and multi-maps that perform content-based routing to one of many default targets with contextual filter augmentation. A CRUD API can allow organizational custom mappings with apply and test endpoints, and mappings can be selected at integration time per resource type. A custom provider YAML defines the authorization method, connector type, endpoints, operation identifiers, and per-operation URL, path, and credential selection, along with pre- and post-mappings for request bodies and responses and hooks for filter and order mapping. At runtime, pipelines compile YAML into compiled transformations, validate reversibility and consistency, and expose a consistent API surface for query, get, patch, post, and delete operations.

The IPaas 120 technical advantages include the explicit, provider-agnostic split of filter and order intermediate representations produced by mappings before provider formatting, enabling a single normalized query surface across heterogeneous providers 130. It provides bi-directional field mapping with selective reversibility controls and one-to-many enumeration handling to support write operations back to providers 130. It enables multi-template composition using pre- and post-partials and multi-map routing within a single schema for content-dependent target selection and query contextualization. It unifies low- and no-code provider creation through YAML-defined providers coupled with mapping templates, improving reliability, testability, and reuse. It separates concerns by having mappings handle semantics while the provider runtime handles transport and formatting, and it offers scoped escape hatches via direct DSL sections for destination, source, filter, and order use cases without sacrificing declarative structure.

The declarative data mapping schema focuses on representing how data moves from the provider into the final response format while supporting reverse transformation into the provider format to the fullest extent possible. The YAML definition is parsed into transformation logic for different use cases, including incoming and outgoing data, filtering, and ordering, and metadata is extracted more easily than with a pure DSL. YAML serves as the transformation DSL for actual data translation, and another programming language (e.g., Bloblang, Rego, JavaScript, etc.) provides escape hatches to embed direct transformations for complex cases, with separate definitions for each use case when used. Data transformations are bi-directional but must account for static data that is not reverse mapped, enumerations that can map one-to-many, complex direct mappings that require explicit reverse definitions, and fields that should be excluded from reverse mapping.

Order mapping can support provider-level ordering when listing or querying data by translating user-requested orderings expressed in terms of normalized response paths into normalized keys and directions in an intermediate ordering format. Because providers vary widely in how ordering is specified, the mapping performs key transformation before the provider applies protocol formatting. Providers then focus on formatting rather than translating keys or values. Key transformation maps normalized keys to provider locations, allowing flexible overrides and direct DSL when needed. The intermediate ordering format is a list of objects, each with a normalized key and direction, matching the parsed ordering language with keys normalized for the provider.

Filter mapping can similarly support provider-level filtering by translating user-requested filters expressed against normalized response paths into an intermediate filter format of normalized keys, provider-agnostic operators, and typed values. Providers vary in supported keys and operators, and timestamp and enumeration semantics often differ between normalized objects and providers. The mapping normalizes keys and values according to declared data types, including coercing strings into numbers, Booleans, or timestamps. Operator support can be constrained by the mapping for a field or data type to reflect provider capabilities, and unsupported requests result in errors. Additional logical operations can be represented using LIKE-based patterns such as contains, starts with, ends with, non-null matches, and complex patterns, with the mapping translating them to the intermediate representation for later provider formatting.

The schema is versioned and ultimately expressed in a concrete schema definition such as JSON schema, allowing the IPaaS 120 to parse earlier versions. The template definition includes a schema version and a type, importable partials to run before or after the main mapping, static values always added to results, local variables computed via Bloblang, and defaults controlling whether filtering and ordering are enabled unless overridden. Multi-map templates define targets that map incoming context values to default sub-templates, using a context expression over incoming data to perform selection. They can define contextual filters to augment normalized filters when requested fields exist only in a subset of targets, with rules to omit contextual filters when the client explicitly constrains a disambiguating field.

The schema defines data types that control parsing, coercion, and default filtering and ordering behavior. Generic types such as string, number, datetime, Boolean, array, and object are extended by custom types that declare a target generic type, incoming and outgoing coercions, supported filter operators, and ordering capabilities. The fields section performs primary mapping from source to destination paths using dot notation, with a simple shorthand for direct path mappings and an object form allowing options such as data type selection, enumeration mapping, exclusion from source or destination, direct DSL for complex transformations, conditional mapping only when empty, and overrides for filter and order behavior. Enumerations declare destination values mapped from one or more provider values with defaults for unmapped cases and explicit reverse mappings where necessary. Exclusion flags prevent reverse mapping of specific fields or forward mapping where the field is only used for reverse operations. Direct mappings can allow embedded DSL functions for destination, source, filter, and order transformations, where the filter mapping converts strings into the intermediate filter format and the order mapping transforms the intermediate ordering list.

Different types of mappings can be utilized. For example, an Okta Users mapping can have provider fields, such as user identifiers, profile attributes, and timestamps, which map into OCSF entities with appropriate type coercions, operator support, and enum translations for user status and MFA status. This mapping can utilize static values for OCSF class and activity metadata, and direct mappings for derived fields such as group memberships and privileges. As another example, a QRadar mapping can include a multi-map that inspects the QRadar category field to route events to different OCSF targets with contextual filters constraining provider queries to relevant categories, as well as fixed mappings that allow disambiguation based on class identifiers.

FIG. 2 illustrates, in correspondence with the declarative mapping language, provider framework, custom provider configuration definitions, and management APIs described above, a data processing and integration architecture for defining, validating, generating, and executing mappings between provider-specific data models and a common schema. The architecture is organized into a definition layer, parser and generator integration points, and a runtime execution environment, with explicit support for filter and order translation between heterogeneous systems.

In the depicted embodiment, a definition layer 210 provides authoring and composition of mapping and custom provider definition artifacts. A custom mapping, expressed for example in YAML 212, may reference one or more imported artifacts, shown as imports 214 and imports 216, to enable modular reuse and separation of concerns. The definition layer may further include reusable partial definitions, such as a Partial: OCSF Common and a Partial: Timestamps 218, which encapsulate shared field semantics and normalization logic. A multi-map definition component consolidates multiple target mappings into a single specification supporting reuse across providers and use cases, including scenarios with multiple targets. A custom provider definition 213, for example in YAML, can define provider authorization, endpoints, operation identifiers, and per-operation pipelines that apply pre-processing mappings to outgoing requests, format the intermediate filter and order representations into the provider's protocol-specific syntax, and apply post-processing mappings to responses prior to data transformation.

Management of these artifacts is exposed via programmatic interfaces denoted as a Management API 220 which, in turn, can include a Custom Mappings API 222, which in some implementations enable create, read, update, and delete operations on mapping definitions and partials and a Custom Provider API 224 which in some implementations enable create, read, update, and delete operations on custom provider configuration definitions. The management surface further supports an apply or test capability, shown as Apply (test) 230 and 240, enabling validation of mapping behavior against sample inputs prior to deployment.

Downstream from the definition layer, the system provides parser and generator integration points. A YAML parser 232 ingests mapping specifications and extracts structured metadata describing fields, transformations, and type information. An integration point for metadata extraction 242 interfaces with external or internal providers identified, for example, via a mapping providers registry, permitting discovery and alignment of provider schemas with the common schema. Additional generator and integration components, illustrated at 236, 238, 239, and 244, orchestrate the transformation of parsed metadata into concrete artifacts suitable for execution and provider integration.

Based on the parsed definitions and extracted metadata, a set of template generators produce executable templates for multiple concerns. As shown, generators produce templates for provider integration (Integration), incoming data normalization, outgoing data projection, as well as filter translation and order translation. In some examples, a mapping providers interface 250 supplies provider-specific schema traits used by the generators to specialize templates. Certain generator outputs are identified at 262, 264, and 266, corresponding to filter and order translation templates and related artifacts produced for use at runtime.

The generated artifacts are consumed within a runtime execution environment 252. The runtime exposes provider operations implemented atop a transformation engine, here exemplified as a Bloblang engine, to perform end-to-end mapping, normalization, and projection. The runtime supports canonical data operations, including a create operation 254, a query operation 256, and a read operation 259, each of which may invoke appropriate mapping templates and translation logic. Execution paths include bidirectional transformations between provider-specific representations and the common schema, depicted as "Execute: Provider→OCSF" and "Execute: OCSF→Provider," ensuring consistent roundtrip fidelity. At query time, the runtime applies the generated filter translation and order translation artifacts to convert common schema query constraints and sorting directives into provider native expressions and, conversely, to map provider constraints back into the common form.

Collectively, the components in FIG. 2 establish a pipeline in which reusable partials and multi-map definitions authored in the definition layer are validated through apply/test interfaces, parsed and materialized via integration points and template generators, and executed in a provider-agnostic runtime. This architecture enables consistent, repeatable, and testable mappings across multiple providers while preserving provider-specific query semantics through filter and order translation.

FIG. 3 is a process flow diagram 300 for integrating heterogeneous provider systems with a normalized interface in which, at 310, an integration platform receives a declarative mapping template that specifies field-level transformations between a provider schema and a normalized schema. The declarative mapping template is processed, at 320, into compiled transformations. These compiled transformation are executed, at 330, to transform provider response data into the normalized schema for output to a client. Further, at 340, compiled reverse transformations are executed to transform client-supplied data in the normalized schema into the provider schema for submission to one or more of the provider systems. A client query expressed against fields of the normalized schema is translated, at 350, into an intermediate, provider-agnostic filter representation comprising normalized keys, operators, and values. A client ordering request expressed against fields of the normalized schema is translated, at 360, into an intermediate, provider-agnostic order representation comprising normalized keys and directions. At least one of the intermediate filter representation and the intermediate order representation is formatted, at 370, into a provider-native request format for transmission to one or more of the provider systems, either by system defined providers, or custom providers through a custom provider configuration definition. In some variations, these operations are performed without storing provider data at rest in the integration platform.

FIG. 4 is a process flow diagram for declarative, bidirectional data mapping between heterogeneous provider schemas and a normalized schema in which, at 410, an integration definition is received that includes a versioned mapping schema defining field-level transformations including enumerations, coercions, local variables, static inserts, and reverse mappings. The mapping schema is parsed, at 420, into transformation logic for data transformation, filter translation, and order translation use-cases. Bi-directional data transformations are applied, at 430, between provider data schema and the normalized schema using the transformation logic. User-facing filter expressions are translated, at 440, into a provider-agnostic intermediate filter representation (IFR) and mapping the IFR to provider-native query syntax. In addition, at 450, user-facing order expressions are translated into a provider-agnostic intermediate order representation (IOR) and the IOR is mapped to provider-native ordering syntax. Still further, at 460, incoming data is routed to one of multiple target schemas based on content using a multi-map template schema.

Some or all aspects of the workflows or other operations described herein can be implemented by autonomous agents. In this context, agents, or AI agents, are autonomous software entities that utilize advanced artificial intelligence techniques—including LLMs, reinforcement learning (including contextual bandits), planning and scheduling algorithms, and other machine learning methods—to perceive their environment (potentially across text, images, audio, video, sensor streams, and structured data), interpret complex information, make context-aware decisions under uncertainty, and execute actions to achieve objectives defined by human operators or higher-level policies.

Such agents can orchestrate end-to-end pipelines by routing requests, performing semantic task decomposition, and coordinating data flow among heterogeneous components (e.g., rule engines, retrieval systems, analytics services, and specialized ML models). They can dynamically select and parameterize models (semantic routing, few-shot configuration, prompt/program synthesis), manage tool invocation (APIs, databases, vector stores, message queues, Robotic Process Automation (RPA), robotic/IoT actuators), and adapt behavior based on intermediate results, user feedback, or changing requirements. Agents can maintain short- and long-term memory, ground reasoning via retrieval-augmented generation, and update knowledge bases while enforcing data governance, privacy, and security constraints (e.g., PII redaction, access control, secret management, key rotation, policy enforcement).

Agents can operate singly or in multi-agent systems using patterns such as manager-worker, marketplace/contract-net, blackboard, and swarm collaboration, with negotiation, role assignment, and consensus. They can support human-in-the-loop review and escalation, approval workflows, and guardrails (content filtering, compliance checks, safety policies). Operational capabilities can include real-time monitoring, telemetry and tracing, drift and anomaly detection, self-healing retries and fallbacks, circuit breaking, autoscaling, batching and caching, cost/latency/energy optimization, A/B testing, canary releases, and continuous training or fine-tuning. They can manage data preparation and automated feature extraction, perform simulation and sandbox testing, ensure provenance with lineage and signed attestations, and produce detailed audit logs, explanations, uncertainty estimates, and rationales appropriate for regulated environments.

Deployment contexts for aspects leveraging agents can include cloud, on-premises, edge, and air-gapped or intermittent-connectivity settings, with support for offline modes, state checkpoints, idempotent operations, and transactional guarantees. Through these capabilities, agents enable robust, transparent, and scalable automation across discovery, decision-making, execution, and continuous improvement with minimal human intervention while preserving oversight and accountability.

Various implementations of the subject matter described herein can be realized in digital electronic circuitry, integrated circuitry, specially designed application-specific integrated circuits (ASICs), field-programmable gate arrays (FPGAs), tensor processing units (TPUs), neural processing units (NPUs), or other artificial intelligence (AI) accelerators, computer hardware, firmware, software, and/or any combination thereof. Implementations can execute on heterogeneous, distributed, and/or virtualized computing environments, including on-premises systems, cloud platforms (public, private, hybrid, multi-cloud), edge and fog nodes, mobile and embedded devices, and Internet-of-Things (IoT) endpoints. Implementations can be embodied in one or more computer programs or non-transitory computer program products executable and/or interpretable on a programmable system including at least one programmable processor (e.g., central processing unit (CPU), graphics processing unit (GPU), digital signal processor (DSP), tensor processing unit (TPU), neural processing unit (NPU)), which can be special- or general-purpose, coupled to receive data and instructions from, and to transmit data and instructions to, one or more storage systems, input devices, and output devices.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), SystemVerilog) and accelerator programming models (e.g., Open Computing Language (OpenCL), SYCL). As used herein, "machine-readable medium" refers to any non-transitory computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. The term "non-transitory" as used herein excludes transitory propagating signals per se, but does not exclude information stored on non-transitory media. A "machine-readable signal" refers to any signal used to provide machine instructions and/or data to a programmable processor, including wired and wireless signals.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), SystemVerilog) and accelerator programming models (e.g., Open Computing Language (OpenCL), SYCL). As used herein, "machine-readable medium" refers to any computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. A "machine-readable signal" refers to any signal used to provide machine instructions and/or data to a programmable processor, including wired and wireless signals.

Storage systems can include volatile and non-volatile memory; local, network-attached, and distributed storage; file, block, and object stores; databases (relational, non-relational (NoSQL), graph, time-series), data warehouses, and data lakes. Processing and storage can be organized using virtualization and isolation technologies including hypervisors, virtual machines, containers, container orchestration systems, serverless functions, sandboxes, unikernels, and WebAssembly runtimes. Deployment and lifecycle management can utilize infrastructure-as-code, configuration management, continuous integration/continuous deployment (CI/CD) pipelines, and observability tooling (logging, metrics, tracing). Implementations can leverage security hardware and services such as trusted platform modules (TPMs), hardware security modules (HSMs), secure enclaves/trusted execution environments (TEEs), cryptographic modules, and identity and access management systems; and can employ encryption in transit and at rest, attestation, code signing, and secure boot.

To provide for interaction with a user, the subject matter can be implemented on devices with displays (e.g., light-emitting diode (LED), liquid crystal display (LCD), organic light-emitting diode (OLED), electronic ink (e-ink), augmented reality (AR), virtual reality (VR), mixed reality (MR) headsets) and input mechanisms (e.g., keyboard, mouse, trackball, touchpad, touchscreen, stylus, game controller, remote control). Additional input and feedback modalities can include microphones, speakers, cameras, depth sensors, biometric sensors, haptic devices, eye tracking, gesture recognition, voice assistants, and brain-computer interfaces. Feedback can be visual, auditory, haptic, or multimodal. Implementations can support accessibility features (e.g., screen readers, captioning, alternative input).

The subject matter can be implemented in a computing system including back-end components (e.g., data servers, storage clusters, compute clusters, artificial intelligence (AI) training/inference services), middleware components (e.g., application servers, message brokers, application programming interface (API) gateways, event streams), and/or front-end components (e.g., client applications, web browsers, mobile applications (apps), thin clients), or any combination thereof. Components can be interconnected by any form or medium of digital data communication, including wired and wireless networks and protocols such as Ethernet, Infini-Band, controller area network (CAN) bus, wireless fidelity (Wi-Fi), Bluetooth/Bluetooth Low Energy (BLE), near-field communication (NFC), Zigbee, Z-Wave, long range (LoRa)/ LoRa wide area network (LoRaWAN), cellular (third generation (3G), fourth generation (4G), fifth generation (5G), sixth generation (6G)), satellite, mesh networks, and the Internet. Protocols can include transmission control protocol/internet protocol (TCP/IP), user datagram protocol (UDP), quick UDP internet connections (QUIC), hypertext transfer protocol (HTTP/2-HTTP/3), WebSockets, gRPC (gRPC remote procedure calls), message queuing telemetry transport (MQTT), advanced message queuing protocol (AMQP), constrained application protocol (CoAP), and industrial protocols. Systems can employ software-defined networking, load balancing, content delivery networks, caches, and time synchronization (e.g., network time protocol (NTP), precision time protocol (PTP)). Processing can occur centrally, at the edge, on-device, or in federated and/or privacy-preserving arrangements, and can support online, offline, batch, streaming, and real-time modes.

The computing system can include clients, servers, and other interconnected components that may be distributed across various physical or virtual locations. Clients and servers can be remote from each other and typically interact through one or more communication networks, which can include local area networks, wide area networks, the Internet, or wireless and mobile networks. Clients can include desktop computers, laptops, mobile devices, web browsers, thin clients, IoT devices, or edge nodes, while servers can include physical or virtual machines, cloud-based instances, microservices, containers, or serverless functions. The client-server relationship can be established by computer programs running on the respective devices, enabling communication, data exchange, and service orchestration. Modern computing environments can support multiple tiers and roles, such as peer-to-peer, edge-to-cloud, and hybrid architectures, where clients and servers may dynamically assume different roles, participate in distributed processing, and interact with middleware, APIs, and other services. These systems can leverage load balancing, failover, replication, and autoscaling to provide robust, scalable, and resilient operation across diverse deployment models.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims, is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. For example, while the current disclosure is directed to integration of cybersecurity applications, the current techniques can be used for other types of applications. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for integrating heterogeneous provider systems with a normalized interface to enable bidirectional data exchange among a plurality of disparate systems, comprising:

receiving, at an integration platform functioning as an intermediary orchestration and translation layer that abstracts heterogeneity of external provider systems, a declarative mapping template that specifies field-level transformations between a provider schema and a normalized schema;

processing the declarative mapping template into compiled transformations;

transforming, by executing the compiled transformations, provider response data received from the heterogeneous provider systems into the normalized schema, and propagating the normalized data to a client application for downstream processing;

transforming, by executing reverse compiled transformations, client-supplied data in the normalized schema into the provider schema for submission to one or more of the heterogeneous provider systems, thereby enabling write operations back to the provider systems through the normalized interface;

translating a client query expressed against fields of the normalized schema into an intermediate, provider-agnostic filter representation comprising normalized keys, operators, and values;

translating a client ordering request expressed against fields of the normalized schema into an intermediate, provider-agnostic order representation comprising normalized keys and directions; and formatting at least one of the intermediate filter representation and the intermediate order representation into a provider-native request format for transmission to one or more of the heterogeneous provider systems either by system defined providers, or custom providers through a custom provider configuration definition;

wherein the integration platform enables client applications to invoke a unified set of integration capabilities through a standardized API without building or maintaining bespoke adapters to each of the heterogeneous provider systems.

2. The method of claim 1, wherein the compiled transformations comprise: data transformation, filter translation, and order translation.

3. The method of claim 1, wherein the declarative mapping template comprises a versioned schema defining, for each mapped field one or more of: a maps to path, a data type, enumeration mappings, reversibility controls, direct transformation scripts, or filter and order overrides.

4. The method of claim 1, further comprising validating, prior to compiling, the declarative mapping template for reversibility of field mappings, data type consistency, and completeness of mappings for the data transformation, and filter translation.

5. The method of claim 1, wherein processing includes generating transformation scripts from the declarative mapping template using an embedded transformation domain-specific language.

6. The method of claim 1, wherein the normalized schema conforms at least in part to a normalized representation.

7. The method of claim 1, wherein the intermediate filter representation comprises a list of objects, each object having a normalized key, an operator selected from a provider-agnostic set, and a list of typed values.

8. The method of claim 1, wherein the intermediate order representation comprises a list of objects each having a normalized key and a direction.

9. The method of claim 1, further comprising normalizing timestamps, enumerations, and Booleans from string query inputs into typed values according to data type declarations in the declarative mapping template prior to forming the intermediate filter representation.

10. The method of claim 1, further comprising rejecting, by the integration platform, a requested filter or order operation not supported by a mapping-defined capability for a target field.

11. The method of claim 1, further comprising generating contextual filters within a multi-target mapping to constrain provider queries to those data subsets relevant to a selected target mapping.

12. The method of claim 1, wherein the declarative mapping template comprises a multimap configuration that: evaluates a context expression over incoming provider data, selects one of a plurality of target default templates based on values of the context expression, and augments translated filters with target-specific constraints when fields mapped only in a subset of the target templates are requested.

13. The method of claim 12, wherein the multimap configuration further defines conditions under which contextual filters are omitted for a client query that explicitly constrains a disambiguating field.

14. The method of claim 1, wherein the declarative mapping template includes partial templates importable as pre- and post-processing stages applied before and after a main mapping.

15. The method of claim 1, wherein the declarative mapping template specifies escape hatch direct mappings for at least one of: destination mapping for provider-to-normalized transformation, source mapping for normalized-to-provider transformation, filter mapping from client-specified constraints to the intermediate filter representation, or order mapping from client-specified ordering to the intermediate order representation.

16. The method of claim 1, further comprising providing a management application programming interface (API) that enables create, read, update, and delete operations for mapping templates, selection of mappings per integration or resource type, and a verify/apply endpoint to test mappings against example payloads.

17. The method of claim 1, further comprising receiving a custom provider configuration definition that declaratively specifies authorization methods, endpoints, operation identifiers, and per-operation pipelines including pre- and post-mappings for uniform resource locator (URL), path, request body, credentials selection, and response shaping.

18. The method of claim 17, wherein executing a per-operation pipeline comprises: applying pre-processing mappings to an outgoing request, formatting the intermediate filter and order representations into the provider's protocol-specific request format, and applying post-processing mappings to a provider response prior to data transformation.

19. The method of claim 1, wherein the data types declared in the mapping include generic types comprising string, number, datetime, Boolean, array, and object, and wherein custom data types specify a target generic type, incoming and outgoing coercions, supported filter operators, and ordering capabilities.

20. The method of claim 1, further comprising selectively excluding mapped fields from reverse transformations to prevent writing specified normalized fields back to the provider.

21. The method of claim 1, further comprising content-based routing of provider records to different normalized targets based on input content, as defined by the multimap configuration.

22. The method of claim 1, wherein the method is performed without storing provider data at rest in the integration platform.

23. A computer-implemented method for declarative, bi-directional data mapping between heterogeneous provider schemas and a normalized schema to enable data exchange among disparate security and information technology systems, comprising:

receiving, at an integration platform, an integration definition comprising a versioned mapping schema defining field-level transformations including enumerations, coercions, local variables, static inserts, and reverse mappings, the integration platform configured to normalize data models, events, and actions across disparate provider APIs;

parsing the mapping schema into transformation logic for data transformation, filter translation, and order translation use-cases;

applying bi-directional data transformations between provider data schema and the normalized schema using the transformation logic, thereby enabling bidirectional data exchange between the integration platform and the heterogeneous provider systems;

translating filter expressions into a provider-agnostic intermediate filter representation (IFR) and mapping the IFR to provider-native query syntax;

translating order expressions into a provider-agnostic intermediate order representation (IOR) and mapping the IOR to provider-native ordering syntax; and routing incoming data to one of multiple target schemas based on content using a multi-map template schema;

wherein the method insulates client applications from changes in provider-specific API contracts by normalizing responses, events, and status data received from the heterogeneous provider systems and propagating the normalized data to the client applications for downstream processing.

24. The method of claim 23, further comprising applying importable partial mapping templates before and after a main mapping template to enable modular and reusable mapping logic.

25. The method of claim 23, wherein the mapping schema supports an embedded language to enable direct and complex transformation logic for destination, source, filter, and order mappings.

26. The method of claim 23, further comprising exposing a management application programming interface (API) to perform create, read, update, and delete (CRUD) operations on mapping templates, including endpoints to verify and test mapping templates against example payloads.

27. The method of claim 23, wherein filter mapping comprises translating user-supplied filtering keys and values into an intermediate filter format consisting of key, operator, and value list objects, and applying provider-specific formatting to construct the provider query.

28. The method of claim 23, wherein order mapping comprises translating user-supplied ordering keys and directions into an intermediate order format consisting of key and direction objects and applying provider-specific formatting.

29. The method of claim 23, further comprising enabling selective exclusion of specific fields from reverse mapping or forward mapping to support unidirectional transformation requirements within the mapping schema.

30. A system for data-driven enterprise integrations that enables bidirectional data exchange among a plurality of heterogeneous provider systems through a normalized interface, comprising:

one or more processors;

a non-transitory computer-readable storage medium storing instructions that, when executed by the one or more processors, cause the one or more processors to execute:

a mapping store configured to persist versioned declarative mapping templates expressed in YAML, each template defining (i) field-level bidirectional data transformations between a provider-native schema and a normalized schema, (ii) key mappings for filters and ordering, and (iii) optional direct transformation snippets in a transformation domain-specific language (DSL);

an intermediate-representation (IR) generator configured to process a selected mapping template into provider-agnostic IRs for filter expressions and order-by lists by normalizing keys, values, and operators independent of provider query syntax;

a runtime engine configured to apply the compiled data transformations to input payloads received from the heterogeneous provider systems and to translate normalized filter/order requests into the IRs, and to apply reverse mappings from the normalized schema to the provider-native schema for write operations, the runtime engine enabling bidirectional data exchange between client applications and the heterogeneous provider systems through the normalized interface;

a provider formatter configured to convert the filter and order IRs into provider-native request formats without further key or value translation; and an API interface configured to expose CRUD operations for mapping templates and a verification endpoint that tests a template against example payloads; and a network interface configured to communicate with external provider systems and client devices, the network interface enabling the system to function as an intermediary orchestration and translation layer that abstracts heterogeneity of the external provider systems;

wherein the system executes integrations statelessly without persisting provider data, supports multi-target routing within a single template to select among multiple normalized schema targets based on content, and enables client applications to invoke a unified set of integration capabilities through a standardized API without building or maintaining bespoke adapters to each of the heterogeneous provider systems.

* * * * *